(12) United States Patent
Kwak (10) Patent No.: US 11,600,845 B2
(45) Date of Patent: Mar. 7, 2023

(54) SECONDARY BATTERY

(71) Applicant: Samsung SDI Co., Ltd., Yongin-si (KR)

(72) Inventor: Seung Ho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 22 days.

(21) Appl. No.: 16/031,894

(22) Filed: Jul. 10, 2018

(65) Prior Publication Data

US 2019/0067728 A1    Feb. 28, 2019

(30) Foreign Application Priority Data

Aug. 31, 2017    (KR) .................. 10-2017-0111141

(51) Int. Cl.
*H01M 10/04*        (2006.01)
*H01M 50/54*        (2021.01)
(Continued)

(52) U.S. Cl.
CPC ....... *H01M 10/049* (2013.01); *H01M 10/045* (2013.01); *H01M 10/0436* (2013.01);
(Continued)

(58) Field of Classification Search
CPC .. H01M 10/049; H01M 2/30; H01M 10/0436; H01M 10/046; H01M 10/0459
See application file for complete search history.

(56) References Cited

U.S. PATENT DOCUMENTS

| 8,628,878 B2 | 1/2014 | Kim et al. |
| 9,034,514 B2 | 5/2015 | Yoshitake et al. |
(Continued)

FOREIGN PATENT DOCUMENTS

| CN | 103262300 A | 8/2013 |
| CN | 103326056 A | 9/2013 |
(Continued)

OTHER PUBLICATIONS

EPO Extended Search Report dated Nov. 30, 2018, for corresponding European Patent Application No. 18190463.2 (7 pages).
(Continued)

*Primary Examiner* — Ula C Ruddock
*Assistant Examiner* — Armindo Carvalho, Jr.
(74) *Attorney, Agent, or Firm* — Lewis Roca Rothgerber Christie LLP (57) ABSTRACT

A secondary battery has increased space utilization efficiency and can increase a capacity of an electrode assembly within a given dimension. In an exemplary embodiment, a secondary battery includes: an electrode assembly including an electrode uncoated portion; a case receiving the electrode assembly; a cap plate coupled to a top portion of the case and sealing the case; and a current collector including a terminal connector positioned between the electrode assembly and the cap plate, and an electrode connector bent at an end of the terminal connector and positioned between the electrode assembly and the case, and the electrode connector includes a first region connected to the terminal connector and protruding toward the case, and a second region positioned under the first region and protruding toward the electrode assembly.

9 Claims, 8 Drawing Sheets

(51) Int. Cl.
  *H01M 50/531* (2021.01)
  *H01M 50/538* (2021.01)
  *H01M 50/543* (2021.01)

(52) U.S. Cl.
  CPC ..... *H01M 10/0459* (2013.01); *H01M 50/531* (2021.01); *H01M 50/538* (2021.01); *H01M 50/54* (2021.01); *H01M 50/543* (2021.01)

(56) References Cited

U.S. PATENT DOCUMENTS

| | | | |
|---|---|---|---|
| 9,059,459 B2* | 6/2015 | Byun | H01M 2/0404 |
| 9,219,267 B2 | 12/2015 | Woo | |
| 9,722,237 B2 | 8/2017 | Guen et al. | |
| 10,158,107 B2 | 12/2018 | Kusama et al. | |
| 2011/0244280 A1 | 10/2011 | Byun et al. | |
| 2011/0250491 A1* | 10/2011 | Kim | H01M 2/0207 |
| | | | 429/176 |
| 2013/0252053 A1 | 9/2013 | Woo | |
| 2013/0260221 A1* | 10/2013 | Yoshitake | H01M 2/024 |
| | | | 429/179 |
| 2013/0330593 A1* | 12/2013 | Kim | H01M 50/543 |
| | | | 429/149 |
| 2015/0270529 A1 | 9/2015 | Guen et al. | |
| 2016/0293921 A1* | 10/2016 | Kusama | H01M 2/1653 |
| 2017/0125778 A1* | 5/2017 | Iwasa | H01M 10/0431 |

FOREIGN PATENT DOCUMENTS

| | | |
|---|---|---|
| CN | 104934565 A | 9/2015 |
| CN | 106165152 A | 11/2016 |
| EP | 2372808 A1 | 10/2011 |
| EP | 3133673 A1 | 2/2017 |
| JP | 2008-4274 A | 1/2008 |
| JP | 2014-116139 A | 6/2014 |
| KR | 10-2010-0108854 A | 10/2010 |
| KR | 10-2010-0115983 A | 10/2010 |
| KR | 10-2011-0109769 A | 10/2011 |
| KR | 10-2011-0114411 A | 10/2011 |
| KR | 10-2015-0044698 A | 4/2015 |
| KR | 10-2016-0118953 A | 10/2016 |
| WO | WO 2015/159433 A1 | 4/2017 |

OTHER PUBLICATIONS

Chinese Office Action from corresponding Chinese Patent Application No. 201810920792.2, Chinese Office action dated Mar. 4, 2021 (7 pgs.).

Korean Office action dated Mar. 22, 2022 issued in corresponding KR Application No. 10-2017-0111141, 5 pages.

* cited by examiner

FIG. 8

SECONDARY BATTERY

CROSS-REFERENCE TO RELATED APPLICATION

This application claims priority to and the benefit of Korean Patent Application No. 10-2017-0111141, filed on Aug. 31, 2017 in the Korean Intellectual Property Office, the entire content of which is herein incorporated by reference.

BACKGROUND

1. Field

Aspects of embodiments of the present invention relate to a secondary battery.

2. Description of the Related Art

Unlike a primary battery that cannot be charged, a secondary battery may be recharged. A low-capacity secondary battery comprised of one single battery cell may be used as a power source for various portable small-sized electronic devices, such as cellular phones, and camcorders. A high-capacity secondary battery in which several tens of battery cells are connected in a battery pack may be used as a power source for motor drives, such as those in electric vehicles or hybrid electric vehicles.

The secondary battery is manufactured in various shapes, and representative shapes include a cylindrical shape and a prismatic shape. The secondary battery is configured such that an electrode assembly formed by positive and negative electrode plates with a separator as an insulator interposed therebetween, and an electrolyte, are housed in a case, and a cap plate is coupled to the case. The electrode assembly is electrically connected to an electrode terminal through a current collector. Here, a volume in the case varies according to a configuration of the current collector. Therefore, there is demand for a secondary battery capable of implementing a larger capacity within a predefined dimension.

SUMMARY

According to an aspect of embodiments of the present invention, a secondary battery increases or maximizes space utilization efficiency of the secondary battery and can increase a capacity of an electrode assembly within a given dimension.

According to one or more embodiments of the present invention, a secondary battery includes: an electrode assembly including an electrode uncoated portion; a case receiving the electrode assembly; a cap plate coupled to a top portion of the case and sealing the case; and a current collector including a terminal connector positioned between the electrode assembly and the cap plate, and an electrode connector bent at an end of the terminal connector and positioned between the electrode assembly and the case, wherein the electrode connector includes a first region connected to the terminal connector and protruding toward the case, and a second region positioned under the first region and protruding toward the electrode assembly.

The electrode uncoated portion may be connected to the second region.

The electrode uncoated portion may be connected to a surface facing the case in the second region.

A thickness of the electrode uncoated portion may be less than a step difference between the second region and the first region.

The secondary battery may further include an auxiliary tab between the electrode uncoated portion and the second region. A thickness of the auxiliary tab may be less than a thickness of the second region.

The secondary battery may further include a retainer coupled to the electrode connector and including a fixing hook.

The first region may include a coupling hole engaged with the fixing hook.

A protrusion height of the fixing hook may be less than a step difference between the second region and the first region.

The terminal connector may have a fuse hole.

The secondary battery may further include a molding member covering the fuse hole and formed on the terminal connector by insert-molding.

The electrode connector may be offset to one side along a stacking direction of the electrode assembly.

The electrode connector may further include a third region positioned under the second region and protruding toward the case. A thickness of the electrode uncoated portion may be less than a step difference between the second region and the third region.

The secondary battery may further include a retainer coupled to the electrode connector and including a fixing hook, and the third region may include a coupling hole engaged with the fixing hook. A protrusion height of the fixing hook may be less than a step difference between the second region and the third region.

As described above, a secondary battery according to an embodiment of the present invention includes a current collecting portion having a second region connected to an electrode uncoated portion and protruded toward an electrode assembly, and first and third regions coupled to a retainer and protruded toward a case, thereby securing a space for being coupled to a fixing hook of the retainer while securing a space for being coupled to the electrode uncoated portion. Accordingly, a size of the secondary battery can be reduced by maximizing the space utilization efficiency, and the capacity of the electrode assembly within a given dimension can be increased.

DETAILED DESCRIPTION

Herein, one or more exemplary embodiments of the present invention will be described in further detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. In addition, as used herein, the term "and/or" includes any and all combinations of one or more of the associated listed items.

In addition, spatially relative terms, such as "below," "beneath," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1:
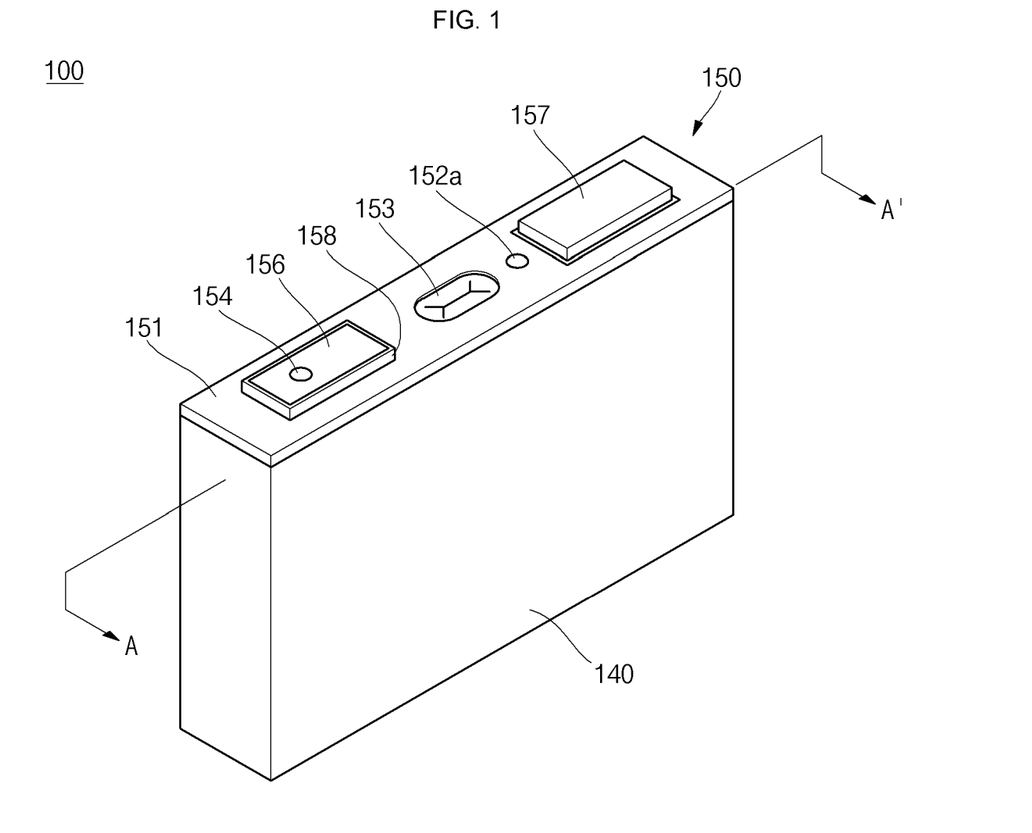
FIG. 1 is a perspective view of a secondary battery according to an embodiment of the present invention.
Figure 2:
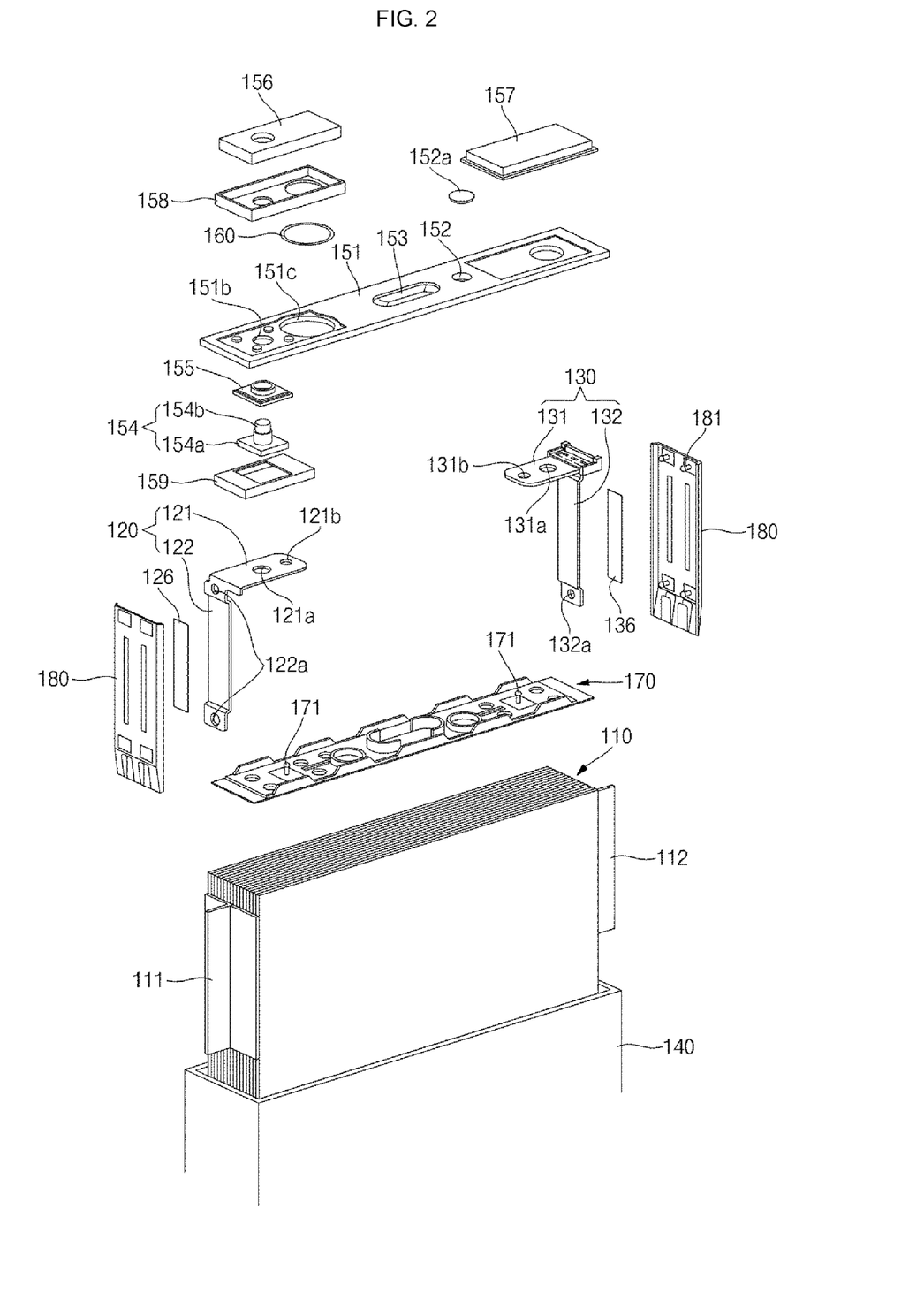
FIG. 2 is an exploded perspective view of a secondary battery according to an embodiment of the present invention.
Figure 3:
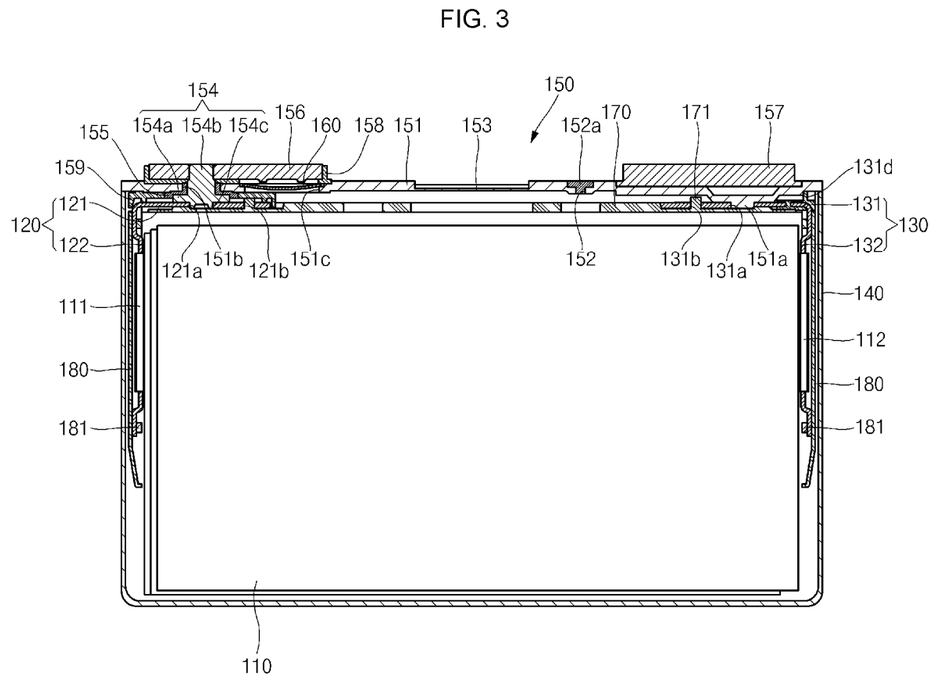
FIG. 3 is a cross-sectional view taken along the line A-A' of FIG. 1.
Figure 4:
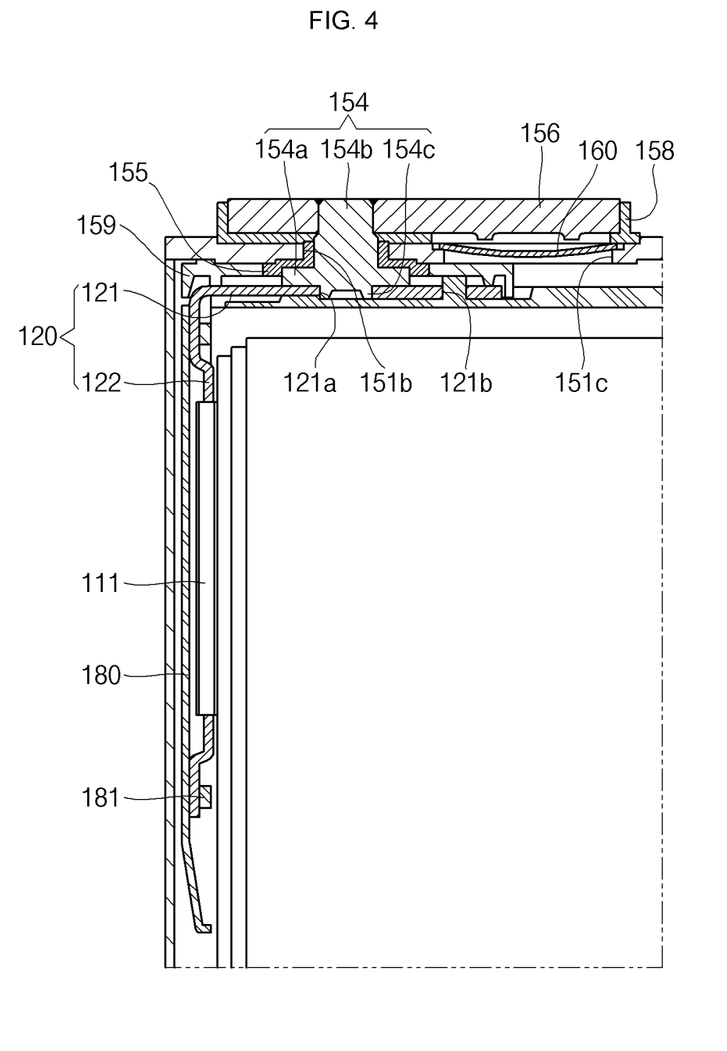
FIG. 4 is a partially enlarged cross-sectional view of FIG. 3.
Figure 5A:
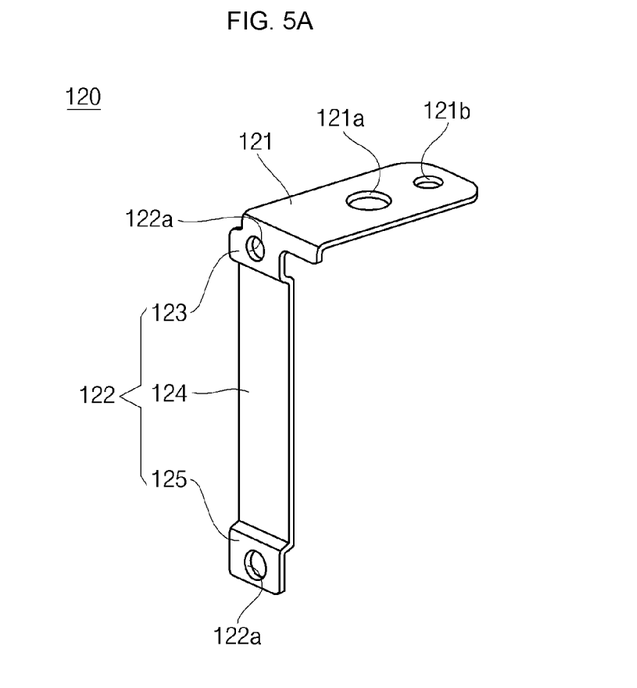
FIG. 5A is a perspective view illustrating a first current collecting portion.
Figure 5B:
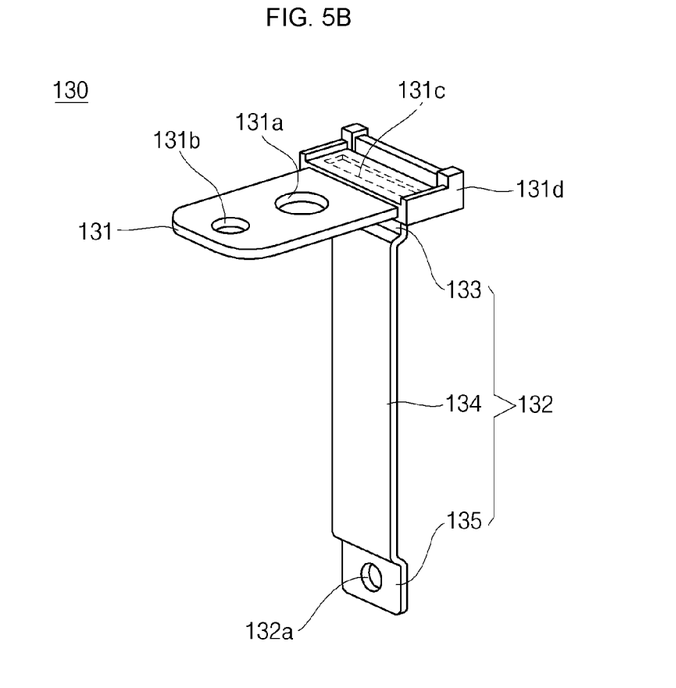
FIG. 5B is a perspective view illustrating a second current collecting portion.
Figure 6A:
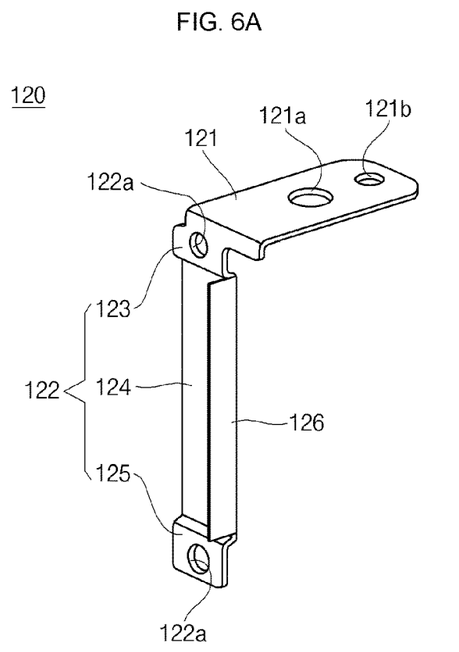
FIG. 6A is a perspective view illustrating a state in which a first auxiliary tab is connected to a first current collecting portion.
Figure 6B:
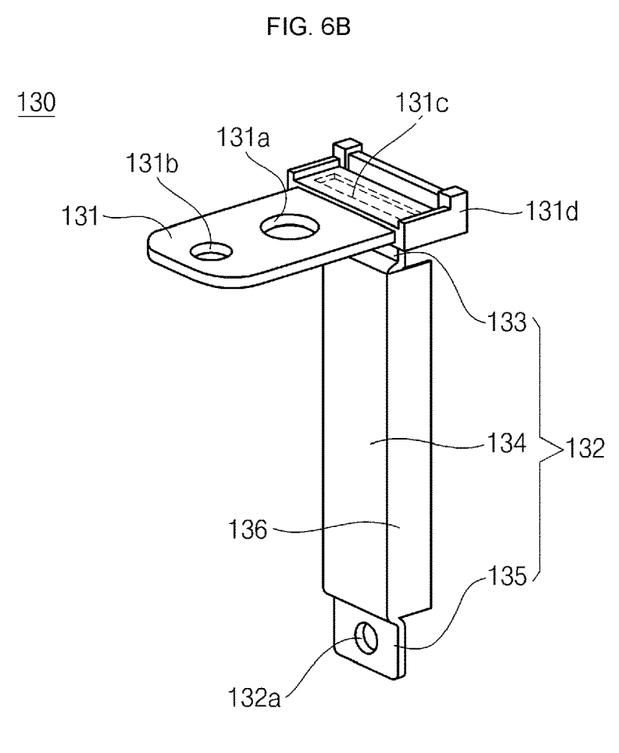
FIG. 6B is a perspective view illustrating a state in which a second auxiliary tab is connected to a second current collecting portion.
Figure 7:
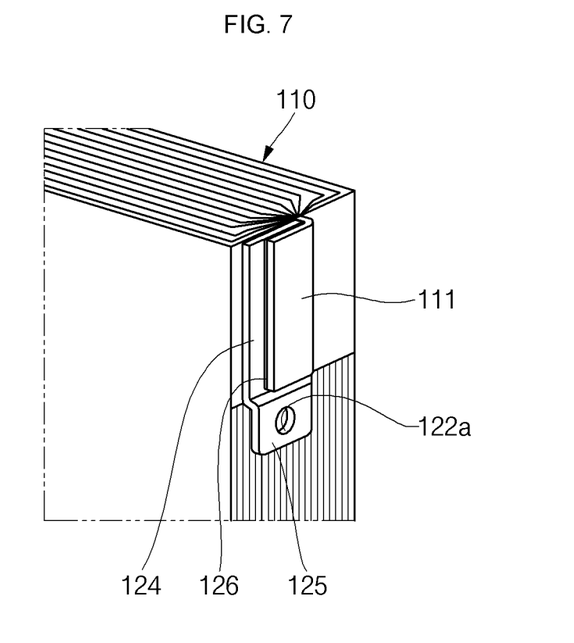
FIG. 7 is a partial perspective view illustrating a connection relationship between an electrode assembly and a current collecting portion.
Figure 8:
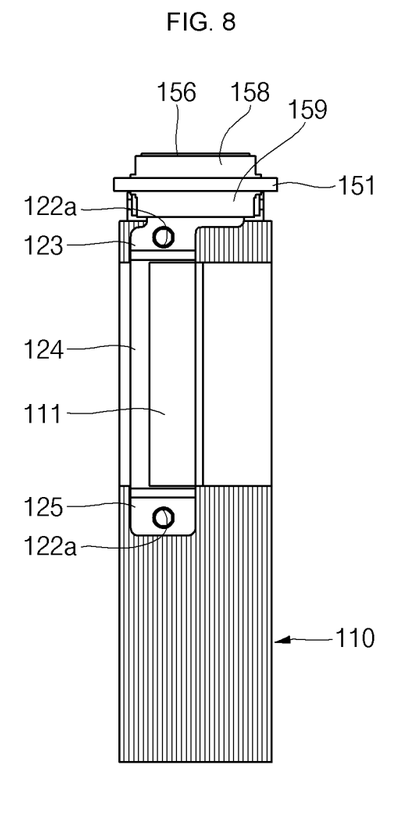
FIG. 8 is a side view illustrating a connection relationship between an electrode assembly and a current collecting portion.

FIG. 1 is a perspective view of a secondary battery according to an embodiment of the present invention. FIG. 2 is an exploded perspective view of a secondary battery according to an embodiment of the present invention. FIG. 3 is a cross-sectional view taken along the line A-A' of FIG. 1. FIG. 4 is a partially enlarged cross-sectional view of FIG. 3. FIG. 5A is a perspective view illustrating a first current collecting portion; and FIG. 5B is a perspective view illustrating a second current collecting portion. FIG. 6A is a perspective view illustrating a state in which a first auxiliary tab is connected to a first current collecting portion; and FIG. 6B is a perspective view illustrating a state in which a second auxiliary tab is connected to a second current collecting portion. FIG. 7 is a partial perspective view illustrating a connection relationship between an electrode assembly and a current collecting portion. FIG. 8 is a side view illustrating a connection relationship between an electrode assembly and a current collecting portion.

Referring to FIGS. 1 to 8, a secondary battery 100 according to an embodiment of the present invention includes an electrode assembly 110, current collecting portions or current collectors 120 and 130, a case 140, a cap assembly 150, an insulation plate 170, and a retainer 180.

In an embodiment, the electrode assembly 110 is formed by a plurality of stacks each including a first electrode plate, a separator, and a second electrode plate, which are thin plates or layers. In an embodiment, the first electrode plate may operate as a negative electrode and the second electrode plate may operate as a positive electrode. Of course, polarities of the first electrode plate and the second electrode plate may be optionally changed by one skilled in the art.

In an embodiment, the first electrode plate is formed by coating a first electrode active material, such as graphite or carbon, on a first electrode current collector formed of a metal foil made of copper or nickel, and includes a first electrode uncoated portion 111 where the first electrode active material is not applied. The first electrode uncoated portion 111 provides a path of a flow of current between the first electrode plate and the outside.

In an embodiment, the first electrode uncoated portion 111 is formed to be overlapped at a same position when the first electrode plates of the plurality of stacks are stacked, forming a multi-tab structure. The first electrode uncoated portion 111 is formed to protrude to one side of the electrode assembly 110. In an embodiment, a plurality of first electrode uncoated portions 111 may be welded to one another, thereby forming a first current collecting tab. In an embodiment, the first current collecting tab is integrally formed with the first electrode plate and is drawn from each of the first electrode plates of the stacks, and current collecting efficiency of the electrode assembly 110 can be advantageously increased. However, the first current collecting tab may also be formed by a separate member optionally provided by one skilled in the art.

In an embodiment, the second electrode plate is formed by coating a second electrode active material, such as a transition metal oxide, on a second electrode current collector formed of a metal foil made of aluminum, and includes a second electrode uncoated portion 112 where the second electrode active material is not applied.

In an embodiment, the second electrode uncoated portion is formed to be overlapped at a same position when the second electrode plates of the plurality of stacks are stacked, forming a multi-tab structure. The second electrode uncoated portion 112 is formed to protrude to the other side of the electrode assembly 110. In an embodiment, a plurality of second electrode uncoated portions 112 may be welded to one another, thereby forming a second current collecting tab.

The separator disposed between the first electrode plate and the second electrode plate may prevent or substantially prevent an electrical short circuit therebetween and allow the movement of lithium ions. In an embodiment, the separator may include polyethylene, polypropylene, or a composite film of polyethylene, polypropylene. However, the present invention is not limited to the materials of the separator listed herein.

The electrode assembly 110 may be received in the case 140 along with, for example, an electrolyte. The electrolyte may include a lithium salt, such as $LiPF_6$ or $LiBF_4$, dissolved in an organic solvent, such as EC (ethylene carbonate), PC (propylene carbonate), DEC (diethyl carbonate), EMC (ethyl methyl carbonate), or DMC (dimethyl carbonate). In addition, the electrolyte may be in a liquid phase, a solid phase or a gel phase.

The current collecting portions 120 and 130 include a first current collecting portion 120 electrically connected to the first electrode plate and a second current collecting portion 130 electrically connected to the second electrode plate.

The first current collecting portion 120 is made of a conductive material, such as nickel, and makes contact with the first electrode uncoated portion 111 protruding to one end of the electrode assembly 110 to be electrically connected to the first electrode plate. In an embodiment, the first current collecting portion 120 includes a first terminal connector 121, a first electrode connector 122, and an auxiliary tab 126. Here, a bent region is formed between the first terminal connector 121 and the first electrode connector 122.

The first terminal connector 121 is positioned on the electrode assembly 110 and is formed to be parallel with a cap plate 151, which will later be described. That is, the first terminal connector 121 is positioned between the electrode assembly 110 and the cap plate 151 and is shaped as a substantially planar plate. The first terminal connector 121 includes a first through hole 121a engaged with an electrode terminal 154 and a second through hole 121b engaged with the insulation plate 170. In an embodiment, the first through hole 121a, compared to the second through hole 121b, is formed adjacent to the bent region.

The first electrode connector 122 is bent at an end of the first terminal connector 121 to downwardly extend and is formed at one side of the electrode assembly 110. The first electrode uncoated portion 111 is connected to the first electrode connector 122. The first electrode connector 122 is bent from the end of the first terminal connector 121 to extend therefrom. In an embodiment, the first electrode connector 122 is formed to be slanted or offset to one side along the stacking direction of the electrode assembly 110. In other words, in an embodiment, the first electrode connector 122 is formed only at one side of the electrode assembly 110 (at the left or right side on the drawing), in view of the central portion of the stacked electrode assembly 110. In this way, a plurality of first electrode uncoated portions 111 may be collected together by forming the first electrode connector 122 to be slanted to one side along the stacking direction of the electrode assembly 110, thereby easily connecting the plurality of first electrode uncoated portions 111 to the first electrode connector 122. That is, since the first electrode connector 122 is slanted to one side along the stacking direction of the electrode assembly 110, the lengths of the first electrode uncoated portions 111 can be minimized or reduced.

Referring to FIG. 5A, the first electrode connector 122 includes a first region 123 bent at the end of the first terminal connector 121 to downwardly extend from the first terminal connector 121, a second region 124 downwardly extending from the first region 123 and protruding toward the electrode assembly 110, and a third region 125 downwardly extending from the second region 124 and protruding away from the electrode assembly 110 (toward the case 140). In an embodiment, the first region 123 and the third region 125 are positioned on the same line. That is, the first electrode connector 122 is configured such that it protrudes toward the electrode assembly 110 at its central portion (i.e., the second region 124). In other words, the first region 123 and the third region 125 are formed to protrude toward the case 140, while the second region 124 is formed to protrude toward the electrode assembly 110. Therefore, the second region 124 is formed in a stepwise manner with respect to the first region 123 and the third region 125. The first electrode uncoated portion 111 is electrically connected to the second region 124. Therefore, a length of the second region 124 is equal to or greater than that of the first electrode uncoated portion 111. Additionally, the first electrode uncoated portion 111 is connected to a surface of the second region 124 facing the case 140. A protrusion thickness of the second region 124 is equal to or greater than a thickness of the plurality of first electrode uncoated portions 111. Therefore, when the first electrode uncoated portion 111 is welded to the second region 124, the first electrode uncoated portion 111 may not protrude to the outside of the first current collecting portion 120. Coupling holes 122a coupled to the retainer 180, which will later be described, are formed in the first region 123 and the third region 125.

Referring to FIG. 6A, the auxiliary tab 126 is coupled to the second region 124. In an embodiment, the auxiliary tab 126 is coupled to one side of the second region 124 by welding, the auxiliary tab 126 being coupled perpendicular to the second region 124. Here, a length of the auxiliary tab 126 may be equal to that of the second region 124. In addition, the auxiliary tab 126 may have a smaller thickness than the second region 124. The first electrode uncoated portion 111 is electrically connected to the second region 124 through the auxiliary tab 126. That is, the auxiliary tab 126 is positioned between the second region 124 and the first electrode uncoated portion 111.

A connection relationship between the first electrode uncoated portion 111 and the first current collecting portion 120 will now be briefly described with reference to FIGS. 7 and 8. First, the first electrode uncoated portion 111 protruding to one side of the electrode assembly 110 is welded to the auxiliary tab 126. Here, the first electrode uncoated portion 111 may include a plurality of first electrode uncoated portions 111, which are welded to one another, thereby forming a first current collecting tab. Then, the auxiliary tab 126 is bent to be brought into contact with the second region 124 of the first electrode connector 122.

In an embodiment, the first electrode uncoated portion 111, the auxiliary tab 126, and the second region 124 are connected to one another by welding, thereby electrically connecting the first electrode uncoated portion 111 to the first current collecting portion 120. Of course, the first electrode uncoated portion 111 may also be directly welded to the second region 124.

The second current collecting portion 130 is made of a conductive material, such as aluminum, and makes contact with the second electrode uncoated portion 112 protruding to the other end of the electrode assembly 110 to be electrically connected to the second electrode plate. In an embodiment, the second current collecting portion 130 includes a second terminal connector 131, a second electrode connector 132, and an auxiliary tab 136. Here, a bent region is formed between the second terminal connector 131 and the second electrode connector 132.

The second terminal connector 131 is positioned on the electrode assembly 110 and is formed to be parallel with the cap plate 151, which will later be described. That is, the second terminal connector 131 is positioned between the electrode assembly 110 and the cap plate 151 and is shaped as a substantially planar plate. The second terminal connector 131 includes a first through hole 131a engaged with an electrode terminal or a terminal protrusion part 151a and a second through hole 131b engaged with the insulation plate 170. In an embodiment, a fuse hole 131c may further be formed in the second terminal connector 131. The fuse hole 131c is formed in a region adjacent to the second electrode connector 132 in the second terminal connector 131. The fuse hole 131c may be formed to have a rectangular shape, for example, an elongated rectangle perpendicular to the lengthwise direction of the second terminal connector 131, but embodiments of the present invention are not limited to the shape disclosed herein. The fuse hole 131c is configured such that it may reduce a cross-sectional area of the second terminal connector 131. When a large amount of current flows through the secondary battery 100 due to occurrence of a short circuit, heat may be generated. A region where the fuse hole 131c is formed may be melted by the generated heat to then be ruptured, thereby cutting off the flow of current.

In an embodiment, a molding member 131d is formed at an end of the second terminal connector 131. The molding member 131d covers the fuse hole 131c. The molding member 131d may also cover the bent region between the second terminal connector 131 and the second electrode connector 132. Here, in order to prevent the molding member 131d from protruding to the outside of the second current collecting portion 130, the bent region may be formed to have a large radius of curvature. In an embodiment, the curvature radius of the bent region of the second current collecting portion 130 is larger than that of the bent region of the first current collecting portion 120. In an embodiment, the molding member 131d is formed on the second terminal connector 131 by insert-molding. The molding member 131d functions to prevent or substantially prevent an arc from occurring when the region where the fuse hole 131c is formed is melted and then ruptured. The molding member 131d may be made of an insulating material, such as polypropylene or polyethylene, but embodiments of the present invention are not limited to the materials disclosed herein.

The second electrode connector 132 is bent at an end of the second terminal connector 131 to downwardly extend and is formed at the other side of the electrode assembly 110. The second electrode uncoated portion 112 is connected to the second electrode connector 132. The second electrode connector 132 is bent at an end of the second terminal connector 131 to extend therefrom. In an embodiment, the second electrode connector 132 is formed to be slanted or offset to one side, that is, to be slanted or offset along the stacking direction of the electrode assembly 110. In an embodiment, the second electrode connector 132 is formed only at one side of the electrode assembly 110 (at the left or right side on the drawing), in view of the central portion of the stacked electrode assembly 110. In this way, the second electrode connector 132 is formed to be slanted to one side along the stacking direction of the electrode assembly 110, such that the plurality of first electrode uncoated portions 111 may be welded to one another and then easily connect the welded first electrode uncoated portions 111 to the first electrode connector 122. That is, since the second electrode connector 132 is formed to be slanted to one side along the stacking direction of the electrode assembly 110, lengths of the first electrode uncoated portions 111 can be minimized or reduced.

Referring to FIG. 5B, the second electrode connector 132 includes a first region 133 bent at an end of the second terminal connector 131 to downwardly extend from the second terminal connector 131, a second region 134 downwardly extending from the first region 133 and protruding toward the electrode assembly 110, and a third region 135 downwardly extending from the second region 134 and protruding away from the electrode assembly 110 (toward the case 140). A coupling hole 132a coupled to the retainer 180, which will later be described, is formed in the first region 133 and the third region 135. In an embodiment, the second electrode connector 132 has substantially a same configuration as that of the first electrode connector 122, and a further detailed description of the second electrode connector 132 will be omitted.

The case 140 is made of a conductive metal, such as aluminum, an aluminum alloy, or nickel plated steel, and is substantially shaped as a hexahedron having an opening through which the electrode assembly 110 can be inserted and placed. The cap plate 151 is coupled to the opening of the case 140 to seal the case 140. In an embodiment, the internal surface of the case 140 is subjected to insulation treatment, thereby preventing or substantially preventing an electrical short circuit from being generated in the case 140. In an embodiment, one electrode of the electrode assembly 110 may be electrically connected to the case 140 through the cap plate 151. In this case, it is possible to prevent or substantially prevent an electrical short circuit from being generated in the case 140 due to the insulation treatment of the internal surface of the case 140. For example, the case 140 may operate as a positive electrode.

The cap assembly 150 is coupled to a top portion (opening) of the case 140. In an embodiment, the cap assembly 150 includes the cap plate 151, an electrolyte injection hole 152, a safety vent 153, the electrode terminal 154, a gasket 155, a first terminal plate 156, a second terminal plate 157, an upper insulation member 158, a lower insulation member 159, and a short-circuit plate 160.

The cap plate 151 is shaped as a plate to seal the opening of the case 140 and may be made of the same material as the case 140. In an embodiment, the cap plate 151 may be coupled to the case 140 by laser welding. In an embodiment, the cap plate 151 may be electrically independent. In some cases, the cap plate 151 may be electrically connected to one of the first current collecting portion 120 or the second current collecting portion 130. For example, the cap plate 151 may be electrically connected to the second current collecting portion 130. In this case, the cap plate 151 and the case 140 may have the same polarity (e.g., a positive polarity).

The electrolyte injection hole 152 for injection of an electrolyte is formed in the cap plate 151. The electrolyte is injected into the case 140 through the electrolyte injection hole 152. Thereafter, the electrolyte injection hole 152 is sealed by a plug 152a. In an embodiment, the terminal protrusion part 151a protruding downwardly (i.e., toward the electrode assembly 110) is formed at one side of the cap plate 151. The terminal protrusion part 151a is engaged with the first through hole 131a of the second current collecting portion 130. Therefore, the cap plate 151 is electrically connected to the second current collecting portion 130. Of course, in another embodiment, a separate electrode terminal may pass through the cap plate 151 to then be coupled to the cap plate 151, and the electrode terminal may also be coupled to the first through hole 131a of the second current collecting portion 130.

In an embodiment, the safety vent 153 having a smaller thickness than other regions is formed at a central portion (a central or approximately central portion) of the cap plate 151. When the internal pressure of the case 140 exceeds a rupture pressure (e.g., a preset rupture pressure), the safety vent 153 may be ruptured, thereby preventing or substantially preventing the secondary battery 100 from exploding.

A terminal hole 151b through which the electrode terminal 154 passes is formed at one side of the cap plate 151. The electrode terminal 154 is formed opposite to the terminal protrusion part 151a formed in the cap plate 151. The electrode terminal 154 is coupled to the first current collecting portion 120 to be electrically connected to the first electrode plate. The electrode terminal 154 includes a body part 154a and a terminal part 154b vertically protruding from the body part 154a. In an embodiment, the terminal part 154b is coupled to the terminal hole 151b of the cap plate 151 and has a top portion riveted to be fixed to the cap plate 151. The body part 154a is formed under the terminal part 154b and has a larger area than the terminal part 154b. In an embodiment, a protrusion 154c is formed on a bottom surface of the body part 154a to be engaged with the first terminal connector 121. The protrusion 154c is engaged with the first through hole 121a of the first terminal connector 121 to electrically connect the electrode terminal 154 to the first current collecting portion 120.

Additionally, the gasket 155 is formed in the terminal hole 151b. The gasket 155 is made of an insulating material and is coupled to the terminal hole 151b under the cap plate 151 to seal a gap between the electrode terminal 154 and the cap plate 151. The gasket 155 may prevent or substantially prevent external moisture from penetrating into the secondary battery 100 and may prevent or substantially prevent the electrolyte received in the secondary battery 100 from flowing out.

The first terminal plate 156 is coupled to the electrode terminal 154 upwardly protruding from the cap plate 151 through the terminal hole 151b of the cap plate 151. In an embodiment, after the first terminal plate 156 is coupled to the electrode terminal 154, a top portion of the electrode terminal 154 is riveted or welded, thereby fixing the electrode terminal 154 to the first terminal plate 156.

The second terminal plate 157 is coupled to a top portion of the cap plate 151 having the terminal protrusion part 151a formed therein. The second terminal plate 157 is coupled to the cap plate 151 by, for example, welding or forced fitting, to be electrically connected to the cap plate 151.

The upper insulation member 158 is positioned between the first terminal plate 156 and the cap plate 151 and electrically insulates the electrode terminal 154 from the cap plate 151. The upper insulation member 158 makes close contact with the cap plate 151 and the gasket 155 through the first terminal plate 156.

The lower insulation member 159 is positioned between the first current collecting portion 120 and the cap plate 151 and electrically insulates the first current collecting portion 120 from the cap plate 151. In an embodiment, the lower insulation member 159 is formed in such a manner that it surrounds the first terminal connector 121 of the first current collecting portion 120. A hole is formed in the lower insulation member 159 to allow the electrode terminal 154 to be coupled to the first terminal connector 121.

The short-circuit plate 160 is formed in a short-circuit hole 151c formed at one side of the cap plate 151. Here, the short-circuit hole 151c is formed in a vicinity of the electrode terminal hole 151b engaged with the electrode terminal 154. The short-circuit plate 160 is positioned between the upper insulation member 158 and the cap plate 151 in the short-circuit hole 151c. Here, a hole corresponding to the short-circuit hole 151c is also formed in the upper insulation member 158. The short-circuit plate 160 is formed as an inversion plate including a downwardly convex round portion and a rim portion fixed to the cap plate 151. The short-circuit plate 160 has a same polarity as the cap plate 151. When the internal pressure of the case 140 exceeds a reference pressure (e.g., a preset reference pressure), the short-circuit plate 160 is inverted (that is, upwardly convexly protrudes) to make contact with the first terminal plate 156 coupled to the electrode terminal 154, thereby causing a short circuit.

The insulation plate 170 is positioned between the cap plate 151 and the electrode assembly 110. The insulation plate 170 protects the electrode assembly 110. In particular, when the cap plate 151 is internally deformed, the insulation plate 170 may prevent or substantially prevent the electrode assembly 110 from being damaged. In an embodiment, coupling protrusions 171 are formed on a top portion of the insulation plate 170 and are coupled to the current collecting portions 120 and 130. The coupling protrusions 171 are formed at opposite sides of the insulation plate 170 and are engaged with the second through hole 121b of the first terminal connector 121 and the second through hole 131b of the second terminal connector 131. In an embodiment, the coupling protrusions 171 are formed as hooks to be engaged with the second through holes 121b and 131b, and the hooks may be tightly fixed without being dislodged from the second through holes 121b and 131b. That is, the insulation plate 170 is positioned between the electrode assembly 110 and the first terminal connector 121 and between the electrode assembly 110 and the second terminal connector 131. The insulation plate 170 may be made of an insulating material, such as polypropylene or polyethylene, but embodiments of the present invention are not limited to the materials disclosed herein.

The retainers 180 are installed between the first current collecting portion 120 and the case 140 and between the second current collecting portion 130 and the case 140. The retainers 180 are coupled to the first electrode connector 122 of the first current collecting portion 120 and the second electrode connector 132 of the second current collecting portion 130, respectively. In an embodiment, the retainers 180 are formed to have larger widths than the first and second electrode connectors 122 and 132 and surround opposite side surfaces of the electrode assembly 110. Therefore, the retainers 180 are coupled to the current collecting portions 120 and 130 to electrically insulate the electrode assembly 110 from the case 140. For brevity and clarity, the following description will focus on the retainer 180 coupled to the first current collecting portion 120.

Fixing hooks 181 are formed on one surface of the retainer 180. The fixing hooks 181 are formed at upper and lower portions of the retainer 180. The fixing hooks 181 are engaged with the coupling holes 122a formed in the first and third regions 123 and 125 of the first electrode connector 122. Here, once the fixing hooks 181 are engaged with the coupling holes 122a, they may be tightly fixed without being dislodged from the coupling holes 122a. Additionally, since the first and third regions 123 and 125, compared to the second region 124, of the first electrode connector 122 are protruded to the outside of the electrode assembly 110, the fixing hooks 181 are not brought into contact with the electrode assembly 110 even if the fixing hooks 181 are engaged with the coupling holes 122a. In an embodiment, a protrusion height of each of the fixing hooks 181 is not greater than a step difference formed between each of the first and third regions 123 and 125 and the second region 124. Accordingly, even when external shocks or vibrations are applied to the secondary battery 100, the fixing hooks 181 can prevent or substantially prevent the electrode assembly 110 from being damaged. The retainer 180 may be made of an insulating material, such as polypropylene or polyethylene, but embodiments of the present invention are not limited to the materials disclosed herein.

As described above, the secondary battery 100 according to an embodiment of the present invention includes the current collecting portion 120 having the second region 124 connected to the electrode uncoated portion 111 and protruded toward the electrode assembly 110 and the first and third regions 123 and 125 coupled to the retainers 180 and protruded toward the case 140, thereby securing a space for being coupled to the fixing hooks 181 of the retainers 180 while securing a space for being coupled to the electrode uncoated portion 111. Accordingly, the product size of the secondary battery 100 can be reduced by maximizing or increasing the space utilization efficiency, and the capacity of the electrode assembly 110 within a given dimension can be increased.

While the secondary battery according to the present invention has been particularly shown and described with reference to one or more exemplary embodiments thereof, it will be understood by those of ordinary skill in the art that various changes in form and details may be made therein without departing from the spirit and scope of the present invention as set forth by the following claims.

What is claimed is:

1. A secondary battery comprising:
   an electrode assembly comprising a first electrode uncoated portion;
   a case receiving the electrode assembly;
   a cap plate coupled to a top portion of the case and sealing the case; and
   a current collector comprising a terminal connector positioned between the electrode assembly and the cap plate and an electrode connector bent at an end of the terminal connector and positioned between the electrode assembly and the case,
   wherein the electrode connector comprises a first region connected to the terminal connector and protruding toward the case, a second region positioned under the first region and protruding toward the electrode assembly, a third region positioned under the second region and protruding toward the case, and an auxiliary tab between the first electrode uncoated portion and the second region, the first electrode uncoated portion is bent with the auxiliary tab and welded to the auxiliary tab, the auxiliary tab directly contacts the second region of the electrode connector, and the first region, the second region, the third region, and the auxiliary tab are offset to one side along a stacking direction of the electrode assembly,
   wherein the second region protrudes toward the electrode assembly in a stepwise manner with respect to each of the first region and the third region such that a first step difference is formed between an outer surface of the second region that faces a first side of the case and an outer surface of the first region that faces the first side of the case and a second step difference is formed between the outer surface of the second region and an outer surface of the third region that faces the first side of the case, and a thickness of a portion of the first electrode uncoated portion that is connected to the outer surface of the second region and faces the first side of the case is less than each of the first step difference and the second step difference.

2. The secondary battery of claim 1, wherein a thickness of the auxiliary tab is less than a thickness of the second region.

3. The secondary battery of claim 1, further comprising a retainer coupled to the electrode connector and comprising a fixing hook.

4. The secondary battery of claim 3, wherein the first region comprises a coupling hole engaged with the fixing hook.

5. The secondary battery of claim 3, wherein a protrusion height of the fixing hook is less than a step difference between the second region and the first region.

6. The secondary battery of claim 1, wherein the terminal connector has a fuse hole.

7. The secondary battery of claim 6, further comprising a molding member covering the fuse hole and formed on the terminal connector by insert-molding.

8. The secondary battery of claim 1, further comprising a retainer coupled to the electrode connector and comprising a fixing hook, wherein the third region comprises a coupling hole engaged with the fixing hook.

9. The secondary battery of claim 8, wherein a protrusion height of the fixing hook is less than a step difference between the second region and the third region.

* * * * *